United States Patent [19]

Demiryont

[11] Patent Number: 4,940,315

[45] Date of Patent: Jul. 10, 1990

[54] PATTERNING OF INSULATOR ON ELECTROCHROMIC MATERIAL AS DETERMINANT FOR AREA OF COLORATION

[75] Inventor: Hulya Demiryont, Dearborn, Mich.

[73] Assignee: Ford Motor Company, Dearborn, Mich.

[21] Appl. No.: 253,655

[22] Filed: Oct. 5, 1988

[51] Int. Cl.$^5$ .............................................. G02F 1/17
[52] U.S. Cl. ................................................... 350/357
[58] Field of Search ........................ 350/357, 353, 355

[56] References Cited

U.S. PATENT DOCUMENTS

| 3,955,879 | 5/1976 | Witzke et al. | 350/357 |
| 4,188,095 | 2/1980 | Nishimura et al. | 350/357 |
| 4,309,083 | 1/1982 | Duchene et al. | 350/357 |

Primary Examiner—Eugene R. LaRoche
Assistant Examiner—Nathan W. McCutcheon
Attorney, Agent, or Firm—Lorraine S. Melotik; Roger L. May

[57] ABSTRACT

This invention is directed to a method for patterning colorable areas of an electrochromic device.

The device comprises two substrates and therebetween: one electrode layer; an electrochromic layer; an insulator material which is (i) non-ionically conductive and (ii) electronically insulating; a solid ion conductive material; and another electrode layer, at least one of the one electrode layer and the other electrode layer being transparent and each electrode layer being in contact with a respective one of the substrates. The ion conductive layer is adapted to communicate ions to and from the electrochromic layer upon application of a voltage across the electrode layes. The method comprises providing areas of the surface of the electrochromic layer which are not to be colorable during operation of the device in contact with the insulator material and not in contact with the ion conductive material, and providing the colorable areas of the surface of the electrochromic layer, which are to be colored upon application of a voltage across the electrode layers, in contact with the ion conductive material. Another aspect of this invention is directed to an electrochromic device patterened according to the method described above.

14 Claims, 1 Drawing Sheet

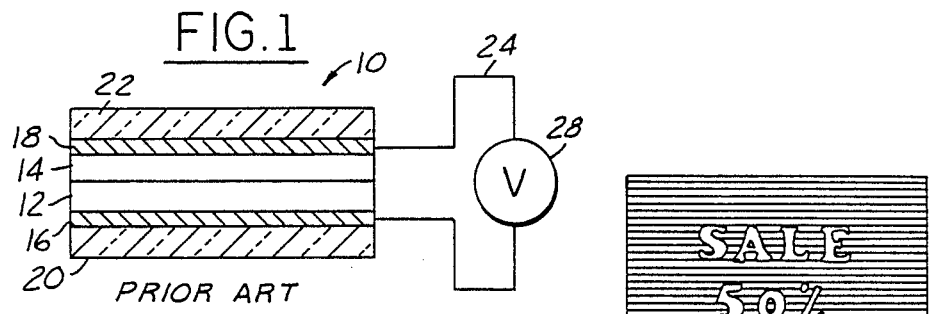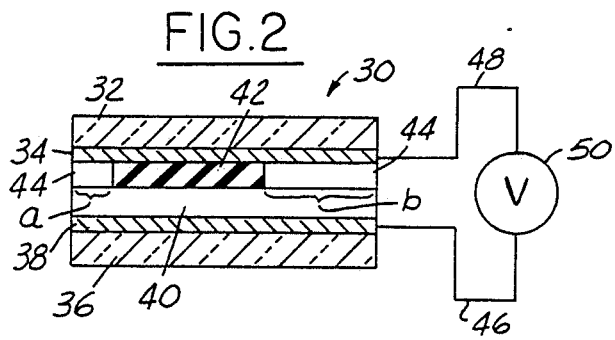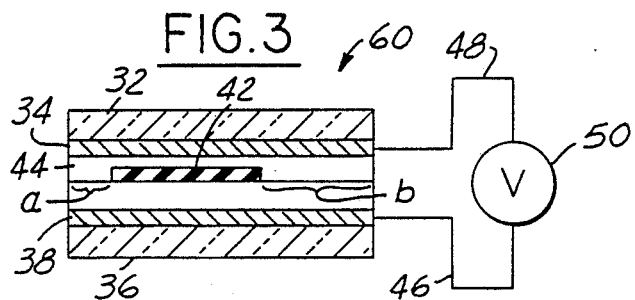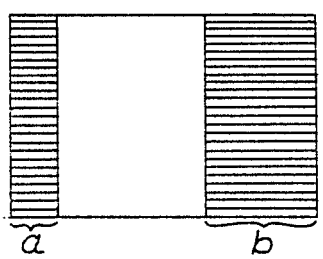

PATTERNING OF INSULATOR ON ELECTROCHROMIC MATERIAL AS DETERMINANT FOR AREA OF COLORATION

BACKGROUND OF THE INVENTION

1. Field of the Invention

The present invention relates to electrochromic devices which exhibit coloration and bleaching thereof at ambient temperature by control of the polarity of an induced electric field. More particularly, this invention relates to a method for providing the area of coloration of such devices by patterning of an insulator on the electrochromic material.

2. Discussion of the Related Art

Electrochromic devices are devices in which a physical/chemical change produced in response to the induced electric field results in a change in the reflective (or transmissive properties) of the device with respect to electromagnetic radiations, e.g., uv, visible and IR radiations. Such devices, one embodiment being shown as item 10 in FIG. 1, generally comprise a film of electrochromic material 12 and an ion-conductive insulating layer 14 which functions as an electrolyte layer. The film and the electrolyte layer are in surface contact with each other for exchange of ions between the electrochromic film and the electrolyte layer. Two conductive electrode layers, 16 and 18 in FIG. 1, at least one of them being transparent, are disposed on the opposite outer surfaces of the film and the electrolyte layer to provide means for applying a voltage across the combined thickness of the electrochromic film and the electrolyte layer. The electrode layers, 16 and 18 in FIG. 1, are provided on substrates, 20 and 22 of FIG. 1, which substrates may be of a material such as glass. Depending on the ion providing and ion storage capacity of ion conductive layer 16, a counter electrode located between ion conductive layer 14 and electrode layer 18 may be used. The electrodes are provided with external electrical leads 24 and 26 connected to a voltage providing source 28. Application of a voltage of proper polarity across the electrodes causes coloration of the electrochromic layer. By reversing the polarity of the applied voltage, the colored electrochromic layer will be uncolored (bleached). Changing from the bleached state to the colored state or from the colored state to the bleached is termed "switching". The electrochromic material may be persistent in either its colored state or its non-colored state. By "persistent" is meant the ability of the material to remain, after removal of the electric field, in the absorptive state to which it is changed, as distinguished from a substantially instantaneous reversion to the initial state. The length of time a material is persistent is called its "open circuit memory" or simply "memory". In some embodiments, the coloration can be erased by simply short circuiting the electrodes through an external circuit, there being enough internally stored charge to supply the reversed voltage required to raise the coloration in the electrochromic layer. Electrochromic devices of this type have been described for several uses, such as image display, for light filtering, etc. See, e.g., U.S. Pat. Nos. 3,708,220, 4,194,812; 4,278,329; 4,645,308; 4,436,769; 4,500,878; 4,150,879; 4,652,090; 4,505,021; and 4,664,934.

In such devices, the electrochromic film usually comprises an inorganic metal oxide material, most commonly a transition metal oxide, in particular: tungsten oxide. When tungsten oxide is the electrochromic material, the electrolyte layer is adapted to provide a positively charged light metal cation, preferably, a proton or a lithium ion. The electrolyte layer is generally a liquid electrolyte solution which comprises polymers or copolymers containing acidic groups such as polystyrene sulfonic acid or a solid compound like lithium chloride. The electrolyte layer also may be a gel like polyvinyl butyral-methanol doped with LiCl.

When the device is to be used as a display device for portraying specific patterns, either or both of the electrodes is patterned in a manner so as to form the desired pattern. For example, the electrodes may be segmented so as to form an alphanumeric display as is well known in the art and disclosed, e.g., in U.S. Pat. No. 3,955,879 to Witzke et al. One of the problems with patterning in this fashion, is that masking of the substrate to apply the electrodes on only specific areas of the substrate can be difficult and less than commercially desirable. Still further, providing a colored pattern during operation of the device by means of a patterned electrode can provide a colored pattern with diffuse edges due to the diffusion of the electric field at the edges of the patterned electrode. Additionally, controlling patterning by means of patterned electrodes requires that leads be provided to each segment of the patterned electrode which if complex and highly segmented requires complex fabrication techniques. This prior art technique also requires that the leads go from the outer edges of the device and continue through the device between the layers to the patterned electrodes. Not only is it possible that these leads will be undesirably visible through the display device but providing such leads may require complex fabrication techniques which would be less than commercially desirable. As described above, the prior art method does not lend itself to the patterning of areas which are complex, segmented, and detailed in design.

It would be desirable if a method could be found to provide patterning of colorable areas of an electrochromic device, which areas may be complex in shape, segmented and detailed in design, according to techniques less problematic than those used in prior art patterning of the electrode. The invention disclosed herein overcomes the problems of prior art techniques for patterning.

SUMMARY OF THE INVENTION

The present invention is directed to a method for patterning of a colorable area of an electrochromic device comprising two substrates and therebetween: one electrode layer; an electrochromic layer; an insulator material which is (i) non-ionically conductive and (ii) electronically insulating; an ion conductive material; and another electrode layer, at least one of the one electrode layer and the other electrode layer being transparent and each electrode layer being in contact with a respective one of the substrates, the ion conductive layer being adapted to communicate ions to and from the electrochromic layer upon application of a voltage across the electrode layers, which method comprises providing areas of the surface of said electrochromic layer which are not to be colorable during operation of said device in contact with the insulator material and not in contact with the ion conductive material, and providing the colorable areas of the surface of said electrochromic layer, which are to be colored upon application of a voltage across the electrode layers, in contact with said ion conductive material. Another aspect of this invention is directed to an electrochromic device patterned according to the method described above.

Advantageously, it has been found that according to embodiments of the method of the present invention it is possible to provide complexly shaped colorable areas of electrochromic devices in a commercially advantageous way.

BRIEF DESCRIPTION OF THE DRAWINGS

FIG. 1 is a schematic representation of an electrochromic device, in cross-section, according to the prior art.

FIGS. 2 and 3 are schematic representations of embodiments of electrochromic device, in cross-section, according to this invention.

FIG. 4 illustrates the color patterning of the devices of FIGS. 2 and 3 during their operation.

FIG. 5 illustrates an embodiment of color patterning which may be obtained according the method of this invention.

DETAILED DESCRIPTION OF THE PREFERRED EMBODIMENT

Electrochromic devices generally comprise two substrates and therebetween one electrode layer, a electrochromic layer, an ion conductive layer, and another electrode layer in that order. Devices of this general type are well known in the art and disclosed for example in the U.S. patents listed above. As discussed above, in the prior art when it is desired to use this device as a display device for portraying specific patterns, either or both of the electrodes may be patterned in a manner so as to form the desired pattern.

In this invention, a method for patterning a colorable area of an electrochromic device comprising two substrates and therebetween: one electrode layer; an electrochromic layer; a insulator material which is both (i) non-ionically conductive and (ii) electronically insulating; an ion conductive material; and another electrode layer, at least one of the one electrode layer and the other electrode layer being transparent and each electrode layer being in contact with a respective one of the substrates, the ion conductive layer being adapted to communicate ions to and from the electrochromic layer upon application of a voltage across the electrode layers. This method comprises providing the areas of the surface of the electrochromic layer which are not to be colorable during operation of the device in contact with the insulator material and not in contact with the ion conductive material, and providing the colorable areas of the surface of the electrochromic layer, which are to be colored during operation of the device, in contact with the ion conductive material.

The invention will be further understood by reference to the embodiments of electrochromic devices according to this invention shown in FIGS. 2 and 3. These figures depict cross-sectional views of the devices 30 and 60, respectively, taken along a line perpendicular to a surface of a substrate of the devices. The devices of FIGS. 2 and 3 each similarly comprise glass substrate 32 in contact with electrode layer 34 and glass substrate 36 in contact with transparent electrode layer 38. The devices of these figures each further comprise insulator material 42 in contact with regions of the surface of electrochromic layer 40, and ion conductive material 44 in contact with other regions of the surface of electrochromic layer 40.

During operation of the device, according to the embodiment shown in FIGS. 2 and 3, a voltage is applied across the electrodes by means of leads 46 and 48 connected to a d.c. voltage source 50. In the embodiments of FIGS. 2 and 3, electrochromic layer 40 comprises a cathodic electrochromic material like tungsten oxide. Assuming that this layer was colorless when deposited on electrode layer 38, a voltage of negative polarity applied to electrode layer 38 would cause the material to change from colorless to blue, i.e., from its bleached to colored state in those regions which are in contact with the ion conductive material. In the devices depicted in FIGS. 2 and 3, if the electrochromic layer 40 is a cathodic material and a negative voltage is applied to electrode layer 38, the pattern of color (colored areas) that would be seen when viewing the device through either of the glass substrates would be that illustrated in FIG. 4, items a and b. The colored areas, a and b of FIG. 4, correspond to the areas, a and b, of contact between electrochromic layer 40 and ion conductive material 44 of FIGS. 2 and 3.

The non-colored (bleached) portions of the electrochromic device when viewed through either of the glass substrates would correspond to those areas of the device where the electrochromic layer 40 is in contact with insulator material 42. Thus, the areas of the device wherein insulator material is in contact with electrochromic material will not be colorable during operation of the device, while the areas of the device wherein ion conductive material is in contact with the electrochromic layer will be colorable during operation of the device. Accordingly, the colored pattern illustrated in FIG. 5 could be obtained during operation of electrochromic devices when the electrochromic material is in its colored state. In such devices, insulator material would be provided in contact with an electrochromic layer in those areas where the patterns appear colorless and ion conductive material would be provided in contact with the electrochromic layer in those areas where the patterns appear colored. As will be apparent to those skilled in the art in view of the present disclosure, during operation (switching) of the device, when the electrochromic material is in its bleached state the entire device would appear bleached. As would be appreciated by those skilled in the art, an electrochromic material can change from one color to another color or from a colorless state to a colored state during operation of the device.

The substrate employed in the device may comprise any material which is stable at the temperatures and under the conditions of the fabrication and use of the device. Commonly used materials for the substrates of such devices include, e.g., glass, quartz, plastic, and the like and suitable combinations, of any of them. At least one of the substrates will be at least translucent, preferably being transparent. Selection of the optimal material to be used for one or both substrates of the device will be apparent to one skilled in the art in view of this disclosure.

The electrodes used in the electrochromic device of this invention may be any material which is electronically conductive. At least one of the electrode-substrate combinations is transparent, although both may be. If it is intended that the electrode be a light transmitting electrode, there may be used a light transmitting film of an electrically conductive metal oxide such as doped or undoped tin oxide, indium oxide, zinc oxide and the like. The thickness of the transparent electrode layer generally falls within the range of 200 nm to several microns, correspondingly varying in transparency and resistance.

The transparent electrode layer may be formed on the substrate by any known technique, including vacuum evaporation, chemical vapor deposition, sol-gel deposition, ion plating, reactive sputtering, etc. The transparent electrode layer may be formed by the so-called thick film processes such as screen printing or coating. When the thick batch film process are used, (1) a paste containing metal compound micro particles or (2) a solution of an organic metal compound such as metal alcoholate or its oligomer is coated and sintered to form the transparent electrode layer. Preferably, the transparent electrode material is tin oxide doped with fluorine. The non-transparent electrode material is selected from light-reflecting electrode materials (e.g., Al, Ag, Pt or Ni) or other electrode materials (e.g., Au, Pd, Cr, Ir, Ru, Rh or C).

The electrochromic layer may be selected from any electrochromic material, many of which are well known to those skilled in the art and commercially available. Cathodic electrochromic materials include non-stoichiometric (i.e., oxygen deficient) metal oxides wherein the metal has variable oxidation states. Exemplary of such cathodic electrochromic materials useful in this invention are those selected from the group comprising tungsten oxide, molybdenum oxide, vanadium oxide, titanium oxide, lead oxide, and bismuth oxide and compatible mixtures of any of them. Anodic electrochromic materials which may be used in this invention include full oxidized compounds comprising metal wherein the metal has variable oxidation states. Exemplary of such anodic electrochromic materials are iridium oxide, and nickel hydroxide and compatible mixtures of any of them. Preferred electrochromic materials for use in electrochromic devices of this invention include non-stoichiometric, oxygen deficient tungsten oxide as the cathodic electrochromic material and fully oxidized iridium oxide as an anodic electrochromic material.

Usually the thickness of the electrochromic layer is between about 0.1 and 100 microns. However, since a small potential will provide an enormous field strength across very thin films, films of 0.1-10 microns thickness are preferred over thicker ones. Optimal thickness also will be determined by the material of the film. The electrochromic layer may be provided on the electrode layer by any suitable technique, for example, by vacuum deposition, chemical vapor deposition, electrolytic, thermal evaporation, sputtering sol-gel deposition, and the like. Selection of the optimal electrochromic material and method of its deposition will be apparent to those skilled in the art in view of the present disclosure.

The ion conductive layer is adapted to contain ions or include an ion source for emitting ions upon application of a voltage across the electrode layers. The ion conductive layer (often referred to as the electrolyte) can be selected from a number of materials. Exemplary of dielectric materials useful as the ion conductive layer are tantalum oxide ($Ta_2O_5$), niobium oxide ($Nb_2O_5$), zirconium oxide ($ZrO_2$), titanium oxide ($TiO_2$), hafnium oxide ($HfO_2$), alumina ($Al_2O_3$), yttrium oxide ($Y_2O_3$), lanthanum oxide ($La_2O_3$), silicon oxide ($SiO_2$), magnesium fluoride, lithium nitrate ($Li_3N$), zirconium phosphate, or a mixture thereof (a thin film of such a dielectric material serves as an insulator for electrons but as a conductor for protons ($H^+$) and hydroxy ions ($OH^-$)). Such material would generally be doped with an ion providing material or the device provided with a counter electrode doped with a ion providing material. Exemplary of solid electrolytes useful as the ion conductive layer are sodium chloride, potassium chloride, sodium bromide, potassium bromide, $Na_3Zr_2Si_2PO_{12}$, $Na_{1+x}ZrSi_{33}P_{3x}O_{12}$, $Na_5YSi_4O_{12}$, or $RbAg_4I_5$. The ion conductive layer may also be a water or proton source-containing synthetic resin copolymer of $\phi$-hydroxyethyl methacrylate with 2-acrylamide-2-methylpropane sulfonic acid, a hydrate vinyl copolymer (e.g., a hydrate methyl methacrylate copolymer), or a hydrate polyester. The ion conductive layer also can be an electrolytic solution of an acid (e.g., sulphuric acid, hydrochloric acid, phosphoric acid, acetic acid, butyric acid, or oxalic acid) or an aqueous solution thereof, an aqueous solution of an alkali (e.g., sodium hydroxide or lithium hydroxide), or an aqueous solution of a solid strong electrolyte (e.g., sodium hydroxide, lithium chloride, potassium chloride, or lithium sulfide. Exemplary of semi-solid gel electrolytes useful as the ion conductive layer are those, for example, obtained by gelling an electrolytic aqueous solution with a gelling agent (e.g., polyvinyl alcohol, CMC, agar-agar or gelatin). Preferably, the ion conductive layer is selected from a material which comprised alkali metal compounds. Most preferably, such compounds are selected from nitrate salts and chloride salts of alkali metal compounds. The alkali metal in such compounds are preferably selected from lithium, potassium and sodium. The ion conductive material comprises an ion source means for providing ions into the electrochromic layer upon application of a voltage across the electrode layers. Selection of the optimal ion conductive material would be apparent to one skilled in the art in view of this disclosure. As is known to those skilled in the art, the thickness of the ion conductive layer may vary, optimal thickness being dependent on such considerations as desired maximum intensity of the color, type of ion conductive material, configuration of the device, etc.

The insulator material component useful in this invention is an electronically insulating material (i.e., it does not conduct electricity) which in addition does not conduct ions. In contrast, the ion conductive material used according to the method of the invention and in the invention device is electronically insulating but is ion conductive. It may be selected from various materials including, but not limited to, polyvinyl butyral (PVB), polyvinyl alcohol, epoxy resins, mylar resins, acrylic resins, $SiO_2$, $Al_2O_3$, $Si_3N_4$, $CeO_2$ and $ZrO$ and the like. Still other materials useful in this invention as the insulator material will be apparent to those skilled in the art in view of the present disclosure. The insulator material may be selected from solid, liquid or gel materials. However, either one or both of the insulator material and the ion conductive material should preferably be a solid or at least a gel for assembling the device. One preferred insulator material for use in this invention is polyvinyl butyral since is it readily commercially available, easily patternable and thermoplastic. It could be applied in the device on the electrochromic layer by lamination. The shape and the thickness of the insulator material is related to the shape and thickness of the ion conductive material as well as the geometry of the device as will be apparent to those skilled in the art in view of the present disclosure.

In the embodiment of the device shown in FIG. 2, the device could be formed by applying electrode 38 on substrate 36 upon which is deposited electrochromic layer 40. In such a situation, the insulator material could be a gel or a solid material, e.g., a patterned flexible polyvinyl butyral layer, subsequently provided on regions of the surface of electrochromic layer 40. If a material such as this is used as the insulator material, it could be cut into the pattern required for a desired non-colorable region of the device and thereafter provided in contact with the desired area of the surface of the electrochromic layer 40. It could also be of a solid, ceramic material, for example, which could be deposited directly by appropriate deposition techniques through a patterned mask onto the desired area of the surface of the electrochromic layer 40. Thereafter, the ion conductive material 44 could be provided in the empty spaces (where there is no insulator material) as seen according to the devices of FIGS. 2 and 3). This ion conductive material could be solid, gel or liquid ion conductive material. Alternately, the ion conductive material, in solid or gel form, could be applied to the electrochromic layer 40 to pattern those areas which are to be colorable during operation of the device. Subsequently, the insulator material (in solid, liquid or gel form) could be provided in those areas which are not to be colorable during operation of the device. Thereafter, substrate 32 having electrode layer 44 thereon could be assembled therewith to form an electrochromic device as in FIG. 2. The same procedure could be followed for fabricating the FIG. 3 device. In this device, however, if the ion conductive material was a liquid or gel, it would be advisable to assemble the device prior to including the ion conductive material by sealing three sides of the device along the edges with a material such as silicone. Thereafter, the liquid or gel ion conductive material could be poured into the cavity in the device. If, on the other hand, the insulator material was a gel or liquid, the ion conductive material would preferably be a solid which was applied first on the electrochromic layer. In this situation, a device of the type of FIG. 2 would be preferably formed. Still other ways of providing the insulator material and ion conductive material to form a device according to the invention will be apparent to those skilled in the art in view of the present disclosure. No limitation is intended herein as to the order or providing the insulator material and ion conductive material of the device and method of this invention. In providing such materials, their state (solid, liquid or gel) as well as design considerations and fabrication techniques would be considered.

As would be apparent to those skilled in the art in view of the present disclosure, the method of this invention is applicable to any electrochromic device. Such devices may comprise other components, e.g., counter electrodes, a second electrochromic layer, etc.. Counter electrodes are generally employed between the ion conductive material and an adjacent electrode of the device (i.e., between layer 34 and material 44 in the device of FIG. 3) to improve operation of the device. It could also be applied on electrode 34 of the device of FIG. 2. A counter electrode may be formed of, e.g., WO$_3$ doped with an alkali metal ion. This material is generally not meant to be electrochromic. Still further, the devices could be mirrored devices by application of a reflective layer on, e.g., the outside surface of one of the substrates. Additionally it is imagined that the device may be of various configurations and designs. For example, the device could be designed to allow placement of, e.g., a flexible patterned solid insulator onto the electrochromic layer, filling of the device (such as that in FIG. 3) with a liquid or gel ion conductor material and their subsequent removal and replacement when another pattern was desired. The device could be designed with hinges that would allow such changing of the patterned area easily. While this invention has been shown suitable to form display device, its use is not meant to be so limited. The method and devices of this invention also could be used, for example, to provide areas of privacy at will, e.g., by changing a glass or plastic office wall made according to this invention to a darkened wall in the lower areas thereof affording privacy within. The present invention might be used to provide the upper portions of windows with the ability to be colored to reduce the transmission of radiation at will. Still other adaptions of the device and method of this invention will be apparent to those skilled in the art in view of the disclosure.

In view of the disclosure, many modifications of this invention will be apparent to those skilled in the art. It is intended that all such modifications which fall within the true scope of this invention be included within the terms of the appended claims.

We claim:

1. A method for patterning a colorable area of an electrochromic device comprising two substrates and therebetween: one electrode layer; an electrochromic layer; an insulator material which is (i) non-ionically conductive and (ii) electronically insulating; a solid ion conductive material; and another electrode layer, said one electrode layer and said other electrode layer being transparent and each electrode layer being in contact with a respective one of said substrates, said solid ion conductive layer being adapted to communicate ions to and from said electrochromic material upon application of a voltage across said electrode layers, which method comprises:

providing areas of said electrochromic layer which are not to be colorable during operation of said device in contact with said insulator material and not in contact with said solid ion conductive material, and providing said colorable areas of said electrochromic layer, which are to be colored upon application of a voltage across said electrodes, in contact with said solid ion conductive material.

2. The method according to claim 1, wherein the said electrochromic layer is selected from tungsten oxide, molybdenum oxide, copper oxide, cobalt oxide, lead oxide, bismuth oxide, iridium oxide and nickel hydroxide.

3. The method according to claim 1, wherein said insulator material is selected from polyvinyl butyral, epoxy resin, $SiO_2$, $Al_2O_3$, $Si_3N_4$, $CeO_2$ and $ZrO$.

4. An electrochromic device according to claim 1, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

5. The method according to claim 1, wherein said ion conductive material is selected from materials comprising hydrogen ions and from materials comprising alkali metal compounds.

6. The method according to claim 5, wherein said alkali metal compounds are selected from compounds comprising nitrates and chlorides of alkali metals.

7. The method according to claim 1, wherein said insulator material is a solid material.

8. An electrochromic device comprising two substrates and therebetween: one electrode layer; an electrochromic layer; an insulator material which is (i) nonionically conductive and (ii) electronically insulating; a solid ion conductive material; and another electrode layer, said one electrode layer and said other electrode layer being transparent and each electrode layer being in contact with a respective one of said substrates, said solid ion conductive layer being adapted to communicate ions to and from said electrochromic layer upon application of a voltage across said electrode layers, wherein areas of said electrochromic layer which are not to be colorable during operation of said device are in contact with said insulator material and not in contact with said solid ion conductive material, and said colorable areas of said electrochromic layer, which are to be colored upon application of a voltage across said electrodes, are in contact with said solid ion conductive material.

9. The device according to claim 8, wherein the said electrochromic layer is selected from tungsten oxide, molybdenum oxide, copper oxide, cobalt oxide, lead oxide, bismuth oxide, iridium oxide and nickel hydroxide.

10. The device according to claim 8, wherein said insulator material is selected from polyvinyl butyral, epoxy resin, $SiO_2$, $Al_2O_3$, $Si_3N_4$, $CeO_2$ and $ZrO$.

11. The device according to claim 8, wherein said one electrode layer and said other electrode layer are individually selected from electrode material consisting essentially of doped or undoped (a) tin oxide, (b) indium oxide, (c) indium tin oxide, (d) zinc oxide, and (e) mixtures of any of them.

12. The device according to claim 8, wherein said ion conductive material is selected from materials comprising hydrogen ions and from materials comprising alkali metal compounds.

13. The device according to claim 12, wherein said alkali metal compounds are selected from compounds comprising nitrates and chlorides of alkali metals.

14. The device according to claim 8, wherein said insulator material is a solid material.

* * * * *